(No Model.)

D. C. WHEELER & W. W. SPERRY.
NUT CRACKER.

No. 483,334. Patented Sept. 27, 1892.

WITNESSES
H. A. Lamb
Clara J. Tuttle

INVENTORS
David C. Wheeler and
William W. Sperry
By J. H. Wooster
Atty.

UNITED STATES PATENT OFFICE.

DAVID C. WHEELER AND WILLIAM W. SPERRY, OF BRIDGEPORT, CONNECTICUT; SAID SPERRY ASSIGNOR TO DWIGHT WHEELER, OF SAME PLACE.

NUT-CRACKER.

SPECIFICATION forming part of Letters Patent No. 483,334, dated September 27, 1892.

Application filed April 22, 1892. Serial No. 430,188. (No model.)

*To all whom it may concern:*

Be it known that we, DAVID C. WHEELER and WILLIAM W. SPERRY, citizens of the United States, residing at Bridgeport, in the county of Fairfield and State of Connecticut, have invented certain new and useful Improvements in Nut-Crackers; and we do hereby declare the following to be a full, clear, and exact description of the invention, such as will enable others skilled in the art to which it appertains to make and use the same.

Our invention has for its object to provide an implement of this class which shall be economical in cost, neat and attractive in appearance, easily operated, of great power, and which will work equally well and with equal power upon large and small nuts.

With these ends in view we have devised the simple and novel nut-cracker, of which the following description, in connection with the accompanying drawings, is a specification, numbers being used to designate the several parts.

Figure 1:
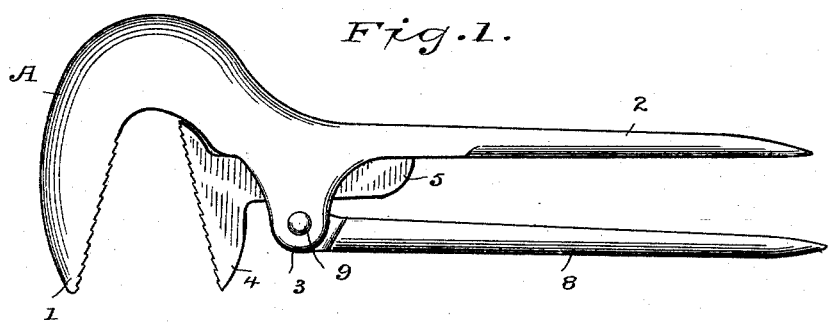
Figure 2:
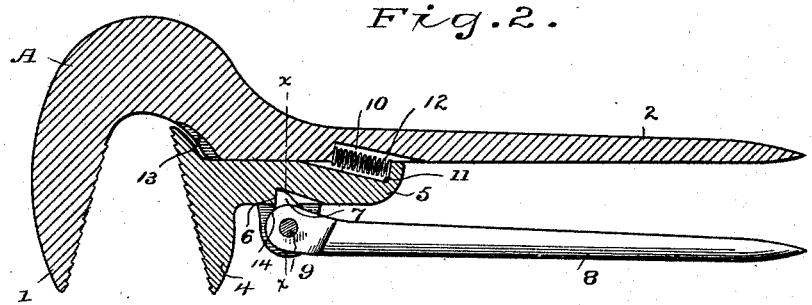
Figure 4:
Figure 3:
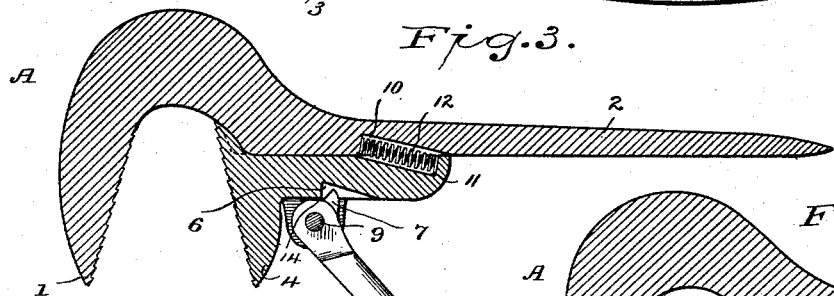
Figure 7:
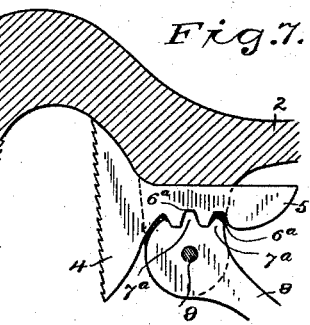
Figure 5:
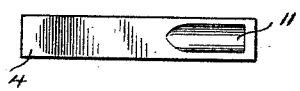
Figure 6:
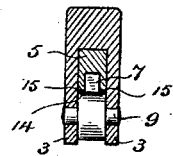

Figure 1 is an elevation of the implement complete; Fig. 2, a longitudinal section, the sliding jaw being in the closed position; Fig. 3, a similar view, the sliding jaw being in the open position; Fig. 4, an inverted plan view of the fixed handle; Fig. 5, an inverted plan view of the sliding jaw; Fig. 6, a cross-section on the line $x\ x$ in Fig. 2; and Fig. 7 is a view corresponding with Fig. 3, illustrating certain changes in the details of construction.

The implement consists of three parts only besides the spring and pivot.

A denotes a casting, which comprises a fixed jaw 1, a fixed handle 2, and a pair of ears 3.

4 denotes the sliding jaw, which is provided with a shank 5, adapted to slide between the ears. The shank of the sliding jaw is provided in its outer side with a recess 6, the forward end of which is preferably a straight wall and which is engaged by a lug 7, the forward end of which is also preferably a straight wall, on the movable handle 8.

9 denotes a pivot, between the ears on which the movable handle is fulcrumed. The inner face of the fixed handle and the sliding jaw are provided, respectively, with recesses 10 and 11, which receive a spring 12, by which the sliding jaw is normally held at the open position, as in Fig. 3.

13 is a recess in the inner face on the fixed handle, which receives the inner end of the sliding jaw, so as to give the latter a greater range of movement. It will be seen in Figs. 3 and 6 that the sliding jaw is at all times held in place, so that it can have no movement, except longitudinal movement, by the rounded end 14 of the movable handle, said rounded end being a circle the center of which is the center of the pivot and said rounded end having a bearing on the sliding jaw on both sides of recess 6, as at 15 in Fig. 6.

In the form illustrated in Fig. 7 the rounded end 14 of the movable handle is provided with one or more segmental lugs $7^a$, which engage suitable recesses $6^a$ in the sliding jaw, said segmental lugs acting to hold the sliding jaw in place in the same manner that it is held in the other form.

The operation will be apparent from Figs. 2 and 3. When the sliding jaw is in the open position, nuts are placed between the jaws and the movable handle pressed toward the fixed handle, as in Figs. 1 and 2. This movement through the engagement of lug 7 with the sliding jaw carries the latter toward the fixed jaw and readily crushes the nut between the jaws. Owing to the special arrangement of the parts the leverage is so great that the largest nuts are cracked with the exercise of but little force, so that the implement can be readily used by ladies or children.

Another important advantage results from the fact that the inward movement of the sliding jaw is in a straight line, so that the power brought to bear upon large and small nuts is just the same.

We find in practice that the implement is equally efficient in cracking large or small and light or heavy nuts.

Having thus described our invention, we claim—

1. A nut-cracker consisting of a fixed jaw, a fixed handle, and ears cast in a single piece, said fixed handle having a recess 10 in its inner side, a sliding jaw having a recess 11 in its inner side and a recess 6 in its outer side, a spring lying in recesses 10 and 11, by which the sliding jaw is moved to the open position, and a movable handle pivoted between the ears and having a lug 7, which engages recess 6 to move the sliding jaw to the closed position.

2. A nut-cracker consisting of a fixed jaw, a fixed handle, and ears formed in a single piece, a sliding jaw lying between said ears and provided with a recess 6 and bearings 15, and a movable handle pivoted between the ears and having a lug adapted to engage the recess and a rounded end adapted to engage bearings 15.

In testimony whereof we affix our signatures in presence of two witnesses.

DAVID C. WHEELER.
WILLIAM W. SPERRY.

Witnesses:
A. M. WOOSTER,
MATTIE R. DAVIS.